No. 827,241. PATENTED JULY 31, 1906.
N. H. HYDE.
COLOR PHOTOGRAPHY.
APPLICATION FILED JAN. 19, 1905.

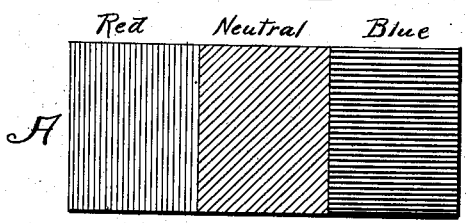

Negative obtained through blue screen

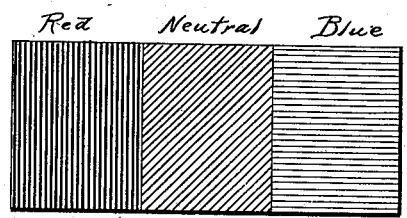

Negative obtained through red screen

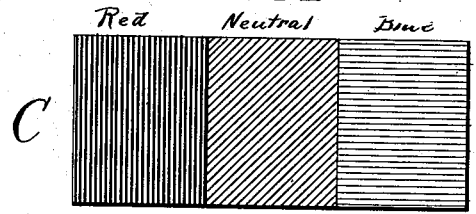

Positive from A

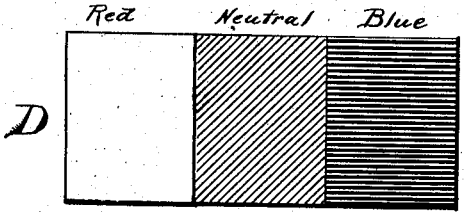

Composite Impression from B and C

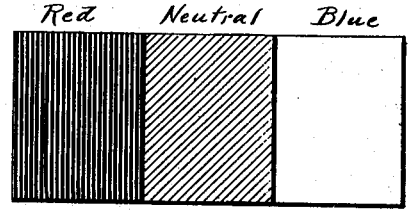

Positive Impression from D

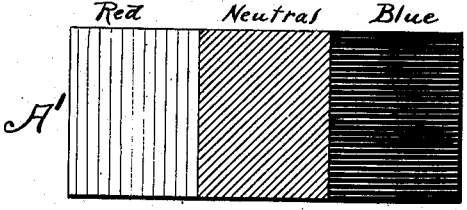

Composite made by combining A & D

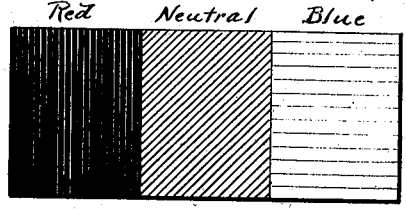

Composite made by combining B & E

Inventor
Newton H. Hyde
by H. B. Willson
Attorney

Witnesses
J. A. Griesbauer, Jr.
C. H. Griesbauer

UNITED STATES PATENT OFFICE.

NEWTON H. HYDE, OF MANCHESTER, IOWA.

COLOR PHOTOGRAPHY.

No. 827,241.  Specification of Letters Patent.  Patented July 31, 1906.

Application filed January 19, 1905. Serial No. 241,810.

*To all whom it may concern:*

Be it known that I, NEWTON H. HYDE, a citizen of the United States, residing at Manchester, in the county of Delaware and State of Iowa, have invented certain new and useful Improvements in Color Photography; and I do declare the following to be a full, clear, and exact description of the invention, such as will enable others skilled in the art to which it appertains to make and use the same.

My invention relates to improvements in color photography, and more particularly to a process for treating and preparing photographic negatives so as to increase the contrast and intensity of the color values of negatives intended for use in making photographic reproductions of objects in colors similar to nature.

In the usual process of making negatives for reproducing colors two or more negatives are made of the same object or view from the same position through differently-colored ray filters or screens on plates particularly sensitive to the various colors of the ray filters or screens used, thereby obtaining two or more negatives each of which will have an image particularly strong or intense with respect to one color. For example, one negative taken through a blue screen will show the parts corresponding to the blue in the object photographed more opaque and the yellow or red more transparent. Another negative taken through a red or yellow ray-screen will be more opaque in the red and yellow and more transparent in the blue, and so on with the negatives taken through ray filters or screens of other colors.

The object of my invention is to increase the contrast and intensity of the color values of such negatives, so that more perfect results may be obtained than has heretofore been possible with negatives made as above described.

In the accompanying drawings, Figures 1 and 2 represent diagrammatically two negatives A B of the same object, taken through differently-colored ray filters or screens, the negative A being taken through a blue screen and the negative B through a red one. Fig. 3 is the positive made from the original negative A. Fig. 4 represents a composite print or impression taken from the negative B and the positive C combined. Fig. 5 represents a positive made from the composite print or impression D. Fig. 6 represents a positive A' made by combining negative A in contact and register with the print or impression D, and Fig. 7 represents a positive B' made by combining negative B in contact and register with the print or impression E.

One mode of practicing my invention is as follows: From two or more negatives of the same subject made through differently-colored ray filters or screens and preferably upon plates each of which is particularly sensitive to one of such colors I make one or more positives and combine them with the proper negatives. For instance, when I have two negatives A B, as illustrated in the drawings, one taken through a blue screen and the other through a red one, I make the positive C from one of them—as shown, from the negative A, which is more opaque in blue. I then adjust this positive C in contact and register with the other negative B—the one more transparent in the blue and more opaque in the red. This combination of the negative B and the positive C causes each to cancel or offset the other in a general way in black and white, while the blue is rendered relatively more transparent and the red more opaque. The combination of a negative B and the positive C causes those parts representing black and white in the original to cancel or offset each other, since the gradations in density in the two are exactly opposite in the parts that were black and white in the original object or view, the gradations of density in regard to the other colors being augmented, since they are similarly located in the negative B and positive C. I then make on a sensitized film upon celluloid film, plate, or paper by light passing through both negative B and positive C, the two being in contact, as described, one or more composite prints or impressions D.

It will be understood that parts of the object or view that were black and white will be respectively transparent and opaque in the negative B and that said black and white parts in the positive C will be reversed—that is, respectively, opaque and transparent—so that when the negative B and positive C are placed in contact and register with each other and the print or impression D is taken the black and white will offset each other—that is to say, the black will be toned down or rendered less black and the white will be to a corresponding extent darkened or rendered less white—in order that they may equalize each other in the composite D. While the black and white will thus equalize or cancel each other in the composite D, the color values will at the same time be strengthened or intensified, the accumulative effect of the composite arrangement of the negative and positive causing the colors to be strengthened or vivified. This strengthening or vivifying of the colors is due partly to the composite arrangement of the negative and positive and partly to the result of the contrast between the colors and the effect resulting from the toning down of the black and the darkening of the white. The composite D may therefore be said to represent the color values apart from the general black and white contrasts. This impression or print D is then used in contact and register with the original negative A, which combination causes an increased contrast in color values, the blue showing more opaque and the red relatively more transparent. In other words, the composite A', which results and which is shown in Fig. 6, has its blue relatively intensified to a marked degree, as shown. Of course A' cannot be actually more transparent in the red than A; but it is relatively more transparent in the red, because it is more opaque in the neutral and decidedly more opaque in the blue. In order to obtain another negative or composite in which the red will be similarly intensified, I make a positive E (shown in Fig. 5) from one or more of the impressions or prints D and combine this positive E with the original negative B in order to obtain the composite B', (shown in Fig. 7,) in which the contrast and intensity of color values are greatly increased, the parts that were originally blue showing relatively more transparent and the red parts decidedly more opaque. It will be seen that I aim to make my composite impression D absolutely transparent in the red and E absolutely transparent in the blue. If still greater intensity of contrast is desired, two or more impressions D are made and placed in contact and register with each other to permit the impression or positive E to be made from them by transmitted light. The use of these negatives in color photography will be readily understood by those skilled in the art, and further description of the entire process is deemed unnecessary.

It will be understood that I may use any method of printing from these negatives. The process may be used for printing photographs or for making half-tones or process-plates to be used on a press.

Having thus described my invention, what I claim as new, and desire to secure by Letters Patent, is—

1. The improvement in color photography, which consists in first making negatives of the same subject, then making a positive from one of said negatives, then making a composite from such positive and one of said negatives when in registration, and then making a photographic impression from said composite and one of the other of said negatives when in registration.

2. The improvement in color photography, which consists in first making negatives of the same subject, each through a ray filter or screen of a distinctive color, then making a positive from one of said negatives, then making a composite from such positive and one of said negatives when in contact and register with each other, and then making a photographic impression from such composite and one of the other of said negatives when in contact and register with each other.

3. The improvement in color photography which consists in first making two negatives of the same subject, each through a ray filter or screen of a distinctive color, then making a positive from one of said negatives, then making a composite from said positive and the other of said negatives while in contact and register with each other, then placing such composite in contact and register with the negative from which said positive was made and obtaining a photographic impression therefrom.

4. The improvement in color photography, which consists in first making negatives of the same subject, then making a positive from one of said negatives, then making a composite from such positive and one of said negatives when in registration, then making a positive from said composite, then placing the last-mentioned positive and said composite in register respectively with certain of said negatives and obtaining photographic impressions therefrom.

5. The process of color photography, which consists in first making two negatives A, B, of the same subject each through a ray filter or screen of a distinctive color, then making a positive from one of said negatives, then making a composite D from said positive C and said negative B while in contact and register with each other, then making a positive E from said composite D, then making photographic impressions A' and B' by placing said composite D in contact and register with said negative A and said positive E in contact and register with said negative B.

In testimony whereof I have hereunto set my hand in presence of two subscribing witnesses.

NEWTON H. HYDE.

Witnesses:
 HUBERT CARR,
 JOS. HUTCHINSON.